United States Patent [19]

Finch

[11] Patent Number: 4,909,190

[45] Date of Patent: Mar. 20, 1990

[54] BOILERS

[75] Inventor: Stanley G. Finch, Beverley, England

[73] Assignee: Stelrad Group Limited, Oxfordshire, United Kingdom

[21] Appl. No.: 356,122

[22] Filed: May 24, 1989

[30] Foreign Application Priority Data

May 24, 1988 [GB] United Kingdom ............... 8812251

[51] Int. Cl.⁴ ............................................. F22B 33/00
[52] U.S. Cl. ...................................... 122/1 A; 165/7; 122/DIG. 1
[58] Field of Search ................ 122/1 R, 1 A, DIG. 1, 122/DIG. 2; 110/302; 165/86, 88, 7, 8

[56] References Cited

U.S. PATENT DOCUMENTS

| | | | |
|---|---|---|---|
| 2,795,213 | 6/1957 | Cooper | 122/1 A |
| 2,803,439 | 8/1957 | Fikenscher | 122/1 A X |
| 4,205,630 | 6/1980 | Regan | 122/1 R |
| 4,206,722 | 6/1980 | Holley, Jr. | 122/1 A |
| 4,836,183 | 6/1989 | Okuno et al. | 165/7 X |

Primary Examiner—Edward G. Favors
Attorney, Agent, or Firm—Watson, Cole, Grindle & Watson

[57] ABSTRACT

A gas fired boiler for a domestic hot water and/or central heating system has a burner (25) (FIG. 1), a static heat exchanger (22) through which water is circulated, and a rotary heat exchanger (12) of which the body is a disc of ceramic material such as is currently used for catalytic conversion in automobile exhaust systems. The rotary heat exchanger recovers heat from the gases passing from the static heat exchanger (22) to the outlet flue 4, and uses this recovered heat for heating the fresh air entering through the air intake (3). A conduit (90) having a controllable valve (91) enables heated fresh air to be supplied for space heating purposes if required, while improving the thermal efficiency of the boiler by promoting condensation of water vapor from the combustion gases as they pass through the rotary heat exchanger.

25 Claims, 3 Drawing Sheets

BOILERS

This invention relates to boilers. More particularly, but not necessarily exclusively, the invention is concerned with gas fired boilers intended for industrial, commercial or domestic hot water and/or central heating systems.

Well known in the art are gas boilers in which air, normally taken from outside the building, flows along a path which includes an air intake, a gas burner, a static heat exchanger through which water is circulated to be heated by the hot gases, and an outlet flue arranged to discharge the gas out of the building. Also known in the art are so-called condensing boilers, in which the flue gases are allowed to condense as they pass the heat exchanger. Because more heat is recovered from the flue gases a significant improvement in the boiler efficiency can be achieved. Existing condensing boilers are not without their drawbacks, however. In order to enable most of the total (i.e. sensible and latent) heat to be recovered the heat-exchanger must be sufficiently extensive along the flue gas flow path; furthermore, a drain must be provided to conduct the condensate water away, and corrosion problems caused by the condensate impose limits on the materials which can be used for the heat exchanger, at least where the condensation occurs. Apart from complicating the construction and manufacture of the boiler itself, the need for the drain is inconvenient from an installation point of view, and freezing of condensate may occur in the drain in severe weather.

A further drawback of condensing boilers is that the desired condensation effect can only occur at temperatures below about 54° C., and this sets an upper limit to the temperature of the water entering the boiler if condensing is to occur on the heat exchanger. For space heating applications the relatively low water inlet temperature may necessitate the use of oversized, and correspondingly obtrusive and expensive, radiators.

Yet another possible drawback of a conventional condensing boiler is that in cold weather the outlet flue may produce a "plume" of condensed water droplets; although unlikely to be dangerous in itself, such pluming is considered to be commercially undesirable as it suggests a substantial loss of heat to the uninformed observer.

In order to improve the thermal efficiency of a boiler it is known, for example from GB Patent Publication No. 2031572, to preheat the incoming air by heat derived from the flue gases by means of a recuperative revolving wheel ("heat wheel"). Hitherto, however, the physical arrangements proposed have been unsuitable for modern premises here space is often at a premium and relative lightness, cheapness and ease of maintenance are important. Applicants seek to provide a boiler having one or more of these attributes at least to a considerable degree, and accordingly, in accordance with one aspect of the invention, provide a boiler having a housing arranged to provide a gas flow path including a first gas plenum and a second gas plenum connected in series relation between an air intake and an outlet flue for the boiler, the first and second plenums having portions in juxtaposition, the boiler having, within the housing, a rotary heat exchanger, a burner and a static heat exchanger, the rotary heat exchanger having a multiplicity of gas passages and being disposed and rotatable so that parts thereof may be moved alternately through the first and second plenums to transfer heat therebetween, at least part of the gas in said flow path being constrained to pass in each of the first and second plenums in opposite directions through said gas passages of the rotary heat exchanger, the burner being disposed in the gas flow path between the said parts of the rotary heat exchanger, and the static heat exchanger being disposed in the gas flow path between the burner and the part of the rotary heat exchanger received in the second plenum and arranged for circulation therethrough of a fluid to be heated.

A boiler as defined in the previous paragraph may be arranged to act solely as a boiler, that is to say, to supply heat only to the fluid passing through the static heat exchanger, in which case condensation, if any, may occur only under certain relatively infrequent conditions of operation. For the most part, therefore, such a boiler is effective to utilize only the sensible heat from the burner; nevertheless, any condensation which does occur will do so in the rotary heat exchanger which by suitable choice of materials, especially multipore ceramic materials, may be readily able to withstand the chemical and thermal conditions to which the rotary heat exchanger is subjected. The static heat exchanger, on the other hand, because it is required only to operate in a non-condensing mode, can be of the relatively inexpensive construction and materials which are conventionally used for non-condensing boilers.

Whilst the invention thus contemplates within its scope a boiler which operates wholly or largely in a non-condensing mode, Applicants propose that the boiler should be arranged to operate substantially or wholly as a condensing boiler, thereby achieving increased thermal efficiency by utilizing the latent heat of vaporization of the moisture in the combustion gases, whilst at the same time providing a supply of heated air which can be used for space heating purposes if required. Accordingly, from a second aspect thereof, the invention provides a condensing boiler, having a housing arranged to provide a gas flow path including a first gas plenum and a second gas plenum connected in series relation between an air intake and an outlet flue for the boiler, the first and second plenums having portion in juxtaposition, the boiler having, within the housing, a rotary heat exchanger, a burner and a static heat exchanger, the rotary heat exchanger having a multiplicity of gas passages and being disposed rotatable so that parts thereof may be moved alternately through the first and second plenums to transfer heat therebetween, at least part of the gas in said flow being constrained to pass in each of the first and second plenums in opposite directions through said gas passages of the rotary heat exchanger, the burner being disposed in the gas flow path between the said parts of the rotary heat exchanger, and the static heat exchanger being disposed in the gas flow path between the burner and the part of the rotary heat exchanger received in the second plenum and arranged for circulation therethrough of a fluid to be heated, the boiler including conduit means connected to the gas flow path between the burner and the part of the rotary heat exchanger received in the first plenum, for removing from the gas flow path some of the air heated by the rotary heat exchanger, in operation of the boiler water vapour condensing in the gas passages of the rotary heat exchanger in the second plenum but the static heat exchanger being non-condensing.

From the foregoing it will be understood that the rotary heat exchanger employed in a boiler in accordance with the present invention should be made of a material which shows a high temperature resistance, and good resistance to thermal shock and corrosion by the combustion gases and any condensate vapour carried in them; moreover, the material should desirably be hygroscopic and capable of safely holding any condensate which is formed until its expulsion from the heat exchanger. In accordance with a preferred feature of the present invention, the rotary heat exchanger has its gas passages provided by a ceramic material similar to those which already are commercially used, after treatment with a catalyst, for catalytic conversion in automobile exhaust systems. In the rotary heat exchanger of the boiler of the present invention gas passages within the ceramic material extend from one side of the heat exchanger body to the other, and so are capable of conducting gas through the body. The passages may be formed by a regular matrix of straight pores of any suitable cross-section, e.g. square, triangular or hexagonal, and typically there may be approximately 400 to 1400 such pores per square inch of the matrix (60 to 200 $cm^{-2}$); alternatively, the material may be of a sponge-like nature and formed randomly with communicating open pores, the passages then being tortuous. In the interests of brevity such a rotary heat exchanger, that is to say, having a rotary body formed of ceramic material, will hereinafter be referred to as a "ceramic heat wheel".

In a boiler in accordance with the present invention the rotary heat exchanger serves to recover residual heat from air and combustion gases which have passed through or over the static heat exchanger, and to transfer this recovered heat to the incoming air passing through the first plenum. Particularly with the use of a ceramic heat wheel and when provided with a bleed connection provided by the conduit means upstream of the burner, substantially all of the residual total heat of the boiler can be recovered in this way, thereby providing a high boiler efficiency which may be comparable with, and possibly better than, those currently obtainable from conventional condensing boilers. In contrast with conventional condensing boilers, however, the efficiency of the boiler will increase as the ambient temperature falls.

Unlike conventional condensing boilers, a condensing boiler in accordance with the present invention does not require a condensate drain. Water vapour condenses out of the combustion gases as they pass through the rotary heat exchanger, so that its latent heat is recovered. However, the condensate forms as tiny droplets in the gas passages of the rotary heat exchanger, and these droplets are picked up by the saturated gas stream passing through the gas passages and carried by the gas stream to leave the boiler through the outlet flue. In this way the temperature of the flue may be lowered to be substantially the same as that of the air entering the air intake, i.e. the outside temperature, so that there is no pluming effect produced in the gas stream issuing from the outlet flue. (A non-pluming characteristic is regarded as being very desirable commercially.) Preferably only part of the incoming cold air is pre-heated by the rotary heat exchanger, the remaining essentially unheated air being used to cool the walls of the boiler so as to obviate or reduce the need for thermal insulation and reduce thermal loss. For a clear understanding of the invention and its different aspects, two gas boilers constructed according to the invention and a modification of one of the boilers will now be described by way of example, with reference to the accompanying drawings in which:

Figure 1:
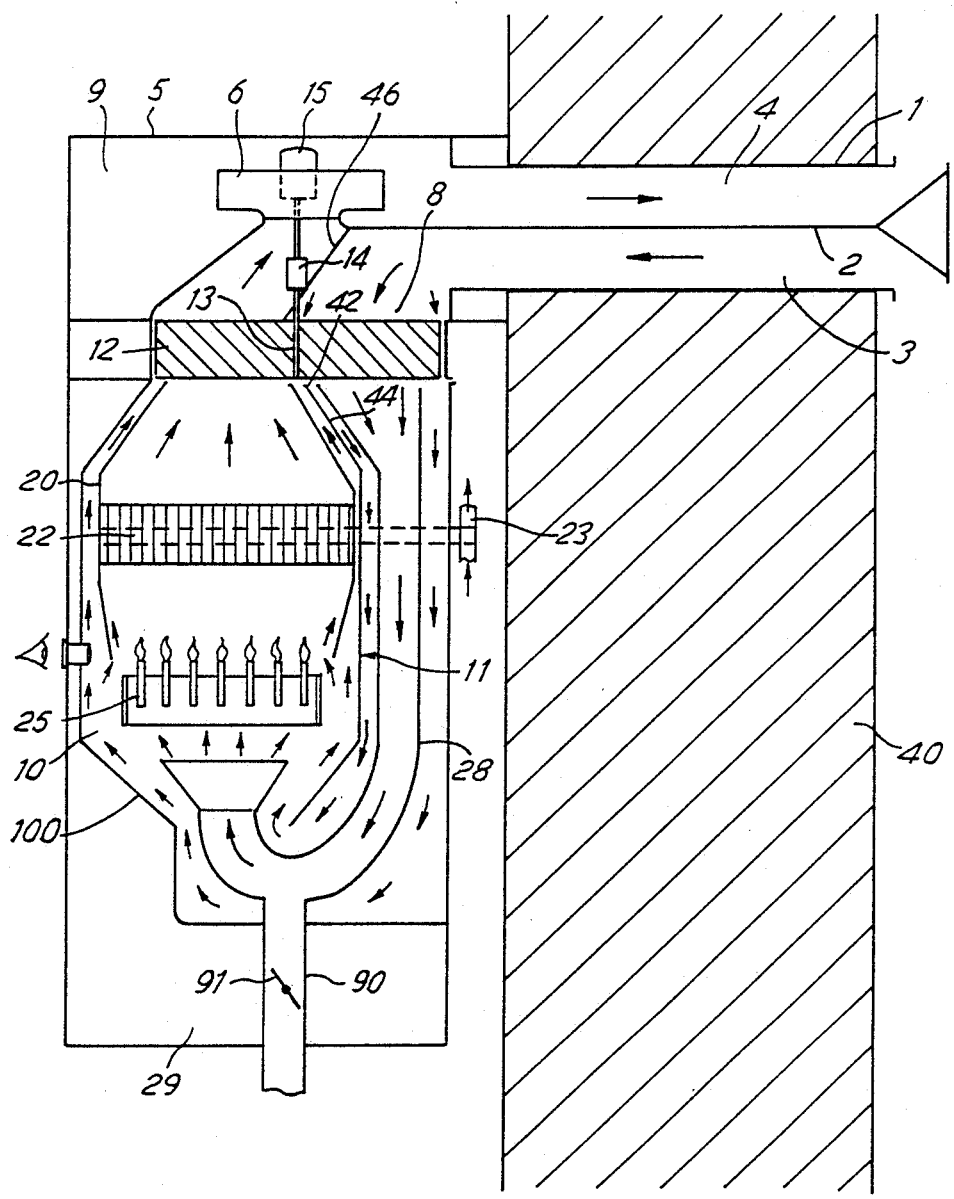
FIG. 1 is a schematic representation showing a first boiler in vertical cross-section.
Figure 3:
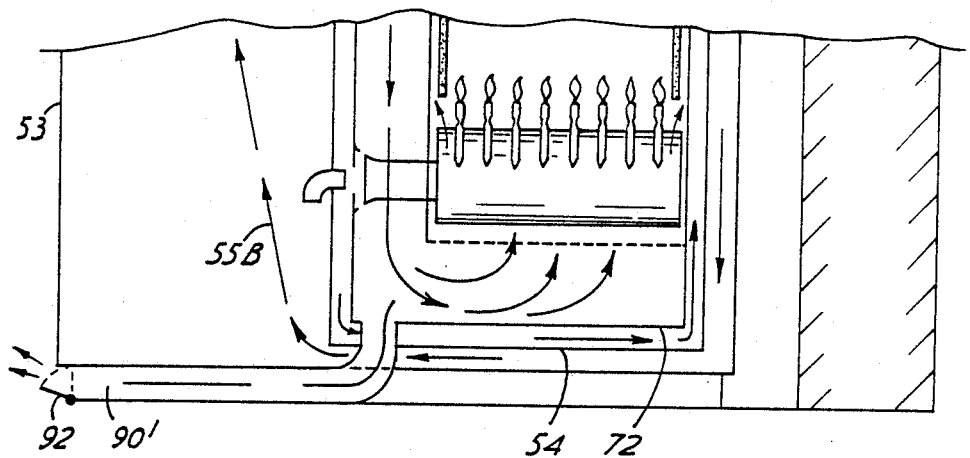

FIG. 3 similarly shows the bottom part only of the second boiler when modified to act as a condensing boiler and to provide a supply of heated fresh air for space heating purposes. The gas-fired boiler illustrated in FIG. 1 is intended for use in a domestic hot water and/or central heating system. It is of compact and lightweight design and, as shown is mounted on an external wall 40 of a building in which it is installed. For the purposes of this description the wall 40 is to be regarded as being located behind the boiler. The boiler has a housing 100 and is mounted within an exterior casing 5. The housing and exterior casing are of lightweight construction and fabricated from steel sheets. They are suitably provided with removable panels (not shown) for easy access and maintenance of the boiler interior.

Extending through the wall is a combined air intake and gas outlet duct 1 which is cylindrical and divided by an interior partition wall 2 to form an air intake 3 and a gas outlet flue 4. The inner end of the duct 1 is connected to exterior casing 5, and the air intake 3 leads into the upper end of a first plenum 8 which constitutes a pre-heating chamber for combustion air entering the boiler as will become clear, whereas the outlet flue 4 communicates with an exhaust chamber 9 between casing 5 and housing 100. The lower end of the first plenum 8 is in communication with the lower end of a second plenum 10. The second plenum is juxtaposed with the first plenum and is connected at its upper end to the exhaust chamber 9 through a centrifugal ducted fan 6.

The plenums 8, 10 are separated by an interior wall 11, and the body of a ceramic heat wheel 12 extends through an upper part of the wall 11 for respective parts to be received in upper portions of the first and second plenums 8, 10. Where it is intersected by the heat wheel the wall 11 extends generally diametrically of the latter. In particular, below the heat wheel the wall has a free edge 42 which makes a small clearance with the heat wheel substantially on a transverse diameter of the wheel; the edge 42 is provided by an inclined but plane part 44 of the wall.

The body of the heat wheel is cylindrical and made of a ceramic matrix material such as is currently used for catalytic conversion in automobile exhaust systems. One such material is formed of a cordierite (magnesium Alumina Silicate), and is manufactured and marketed by Corning Glass Works under the type designation 400; it has a thickness of 60.0 mm and is formed with a multiplicity of square-section passages each extending throughout its thickness and having a distribution density of 62 $cm^{-2}$. The heat wheel is journalled for rotation about a vertical axis on a central drive shaft 13 which is coupled through a gear reduction unit 14 to the output shaft of an electric motor 15. Conveniently, as shown, the fan 6 and the heat wheel are driven in unison.

Supported within the second plenum 10 is a combustion housing 20 which is spaced from the plenum walls and at its upper end makes a small clearance with the heat wheel. The housing accommodates a main, static heat exchanger 22 through which water to be heated is circulated. Inlet and outlet connection pipes 23 are provided for taking the water to and from the static heat exchanger at the rear of the boiler. The static heat exchanger may be of a conventional fabricated, lightweight construction, with interconnected finned tubes for water flow.

The lower end of the combustion housing 20 is open and is located at a small height above a gas burner 25, also mounted in the second plenum. The upper end of the combustion housing converges towards the heat wheel 12, and is shaped and arranged to direct the combustion gases rising through the housing against a part-circular region of the front half of the heat wheel (in relation to the wall 40) lying within a circumscribing narrow annular region which extends around the wheel half-periphery and diametrically across the heat wheel. The outside of this periphery annular region, which is generally D-shaped as seen in plan view, is defined beneath the heat wheel by the exterior wall of the second plenum and by the interior wall 11. As below, this annular region serves for the flow of described air in the upward direction through the heat cooling wheel.

In the first plenum 8, on the downstream side of the heat wheel in the air flow path, an air guide 28 is arranged to collect fresh air passing downwardly through the heat wheel in the first plenum and to guide this air into the lower end of the second plenum at the underside of the burner 25, the outlet end of the air guide being flared to distribute the air over the full area occupied by the burner. The inlet end of the air guide 28, located at a small spacing below the heat wheel, is shaped and positioned to form a mirror image of the upper end of the combustion housing in relation to the free edge 42 of the interior wall 11. Together with the wall of the first plenum 8 and the wall 11 it therefore forms a second, generally D-shaped, circumscribing annular region of similar shape and dimensions to the first and in which cooling air can flow in the downward direction through the heat wheel.

The usual boiler controls can be housed within the casing 5 in a lower compartment 29. The motor 15 is energized to drive the fan 6 and the heat wheel 12, after which the burner is lit. The fan induces a flow through the air intake 3, the first plenum 8, the second plenum 10, the exhaust chamber 9 and out through the outlet flue 4. In the second plenum 10 the hot air and combustion gases from the burner pass through the static heat exchanger 22, giving up most of their heat to the water circulating through the tubes of the latter.

After leaving the static heat exchanger having transferred a substantial proportion of their sensible heat to it, the combustion gases of the burner 25 are guided to and through the heat wheel 12 at its part-circular region within the second plenum 10 as described above. The heat wheel extracts substantially all of the residual sensible heat from the gases, so that their temperature approximates to that of the fresh air entering through the air intake 3. Most of the heat recovered from the flue gases preheats the combustion air, which is largely provided by the fresh air which passes through the part-circular region of the heat wheel in the first plenum 8 and is collected by the combustion air guide 28.

The fresh air which passes through the boiler via the annular band regions of the heat wheel is not warmed to any significant extent, and this cold air forms an insulating barrier which surrounds the potentially hot parts of the boiler to protect those parts from heat and prevent any substantial heat losses through the boiler housing 100 even in the absence of any thermal insulation.

Thus, a flow of cold air surrounds the air guide 28 in the first plenum and thence moves along the inside wall surfaces of the second plenum 20 to maintain these walls at a low temperature before passing through the heat wheel once more. In addition, some of the cold air enters and flows up over the inside surface of the combustion housing 20, so that even this surface remains relatively cool.

The cold air passing through the diametrical regions of the heat wheel not only cools the interior wall 11 and the adjacent parts of the combustion housing 20 and the air guide 28, but it also serves to cool the drive shaft 13 of the heat-wheel 12. There may therefore be no need for heat-resistant bearings for the heat wheel.

Any particles of dust or other contamination which are left on the upper surface of the heat wheel or in the upper ends of its gas passages by the fresh air passing through the first plenum 8 are subsequently carried away by the gases and any condensed water droplets passing through the second plenum 10 in the opposite direction; also, any contamination which may penetrate the gas passages of the heat wheel to any great depth will be incinerated by the high temperatures encountered there. The heat wheel is thus substantially self-cleaning.

For performing its heat recuperating function the heat wheel is rotated at a speed of, typically, 30 rpm. Hot combustion gases entering the heat wheel from the combustion housing 20 will take a small but finite time in moving upwardly through the heat wheel. The part 46 of the interior wall 11 lying above the heat wheel is located with a view to ensuring that all combustion gases have been purged from the heat wheel by the upward cooling air flow in the second plenum, prior to movement of the heat wheel past the wall part 46; if necessary to achieve this, the upper wall part 46 can be retarded in relation to the lower part of the wall in the direction of rotation of the heat wheel. In addition, the gas pressure in the first plenum on the upstream side of the heat wheel will in general be greater than that in the second plenum on the downstream side of the heat wheel, thus, gas flow through the small gap (not shown) between the heat wheel and the wall part 46 will oppose any migration of combustion gases along the upper surface of the heat wheel and into the first plenum. It will thus be understood that any gas which is carried-over by the heat wheel from the second plenum to the first plenum is composed of fresh air which is uncontaminated by the combustion. From the foregoing description it will be understood that the boiler of FIG. 1 can be of a simple lightweight construction and economic to manufacture while still having a high HCV burner efficiency. Furthermore, the duct 1 defining the outlet flue and the air intake can be of any length within a broad range, e.g. 2 metres long, and may extend in different directions without affecting the performance of the boiler.

Figure 2:
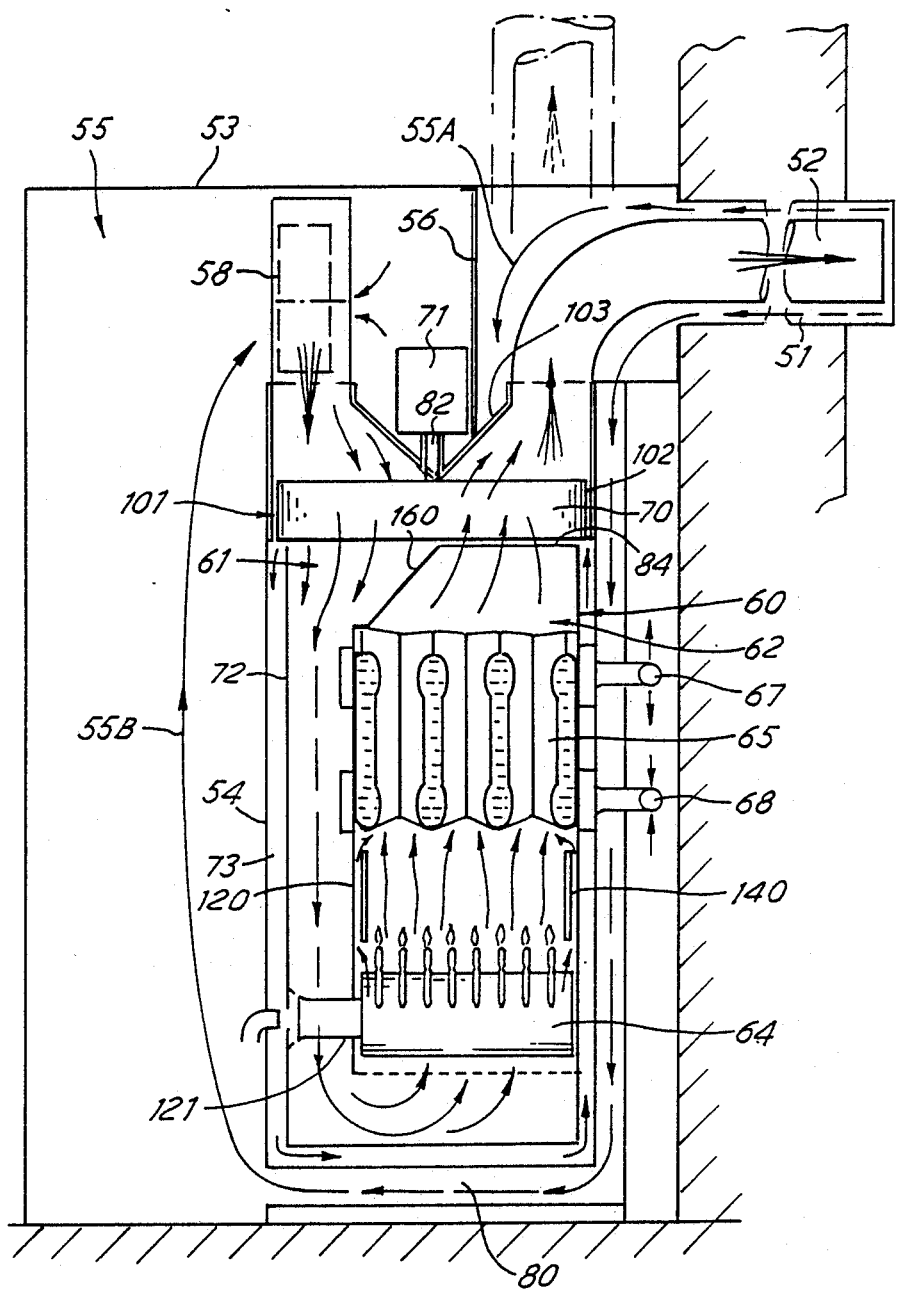
FIG. 2 is a similar view showing a second boiler.

A second boiler embodying the invention and having a ceramic heat wheel is shown in FIG. 2. As illustrated, the boiler is a floor mounted unit having coaxial air intake and flue ducts 51, 52 which extend backwardly and horizontally through the wall of a building, the flue duct 52 being innermost. The boiler has an outer casing 53 and an outer shell 54 defining between them an air inflow plenum 55 which is divided into rear and front compartments 55A, 55B by a generally plane and vertical partition wall 56. The wall 56 extends between the outer shell and the casing at the top and two sides of the boiler but stops short of the bottom of the casing. The air intake 51 communicates with the upper part of compartment 55A, while the upper part of compartment 55B communicates with the inlet of a ducted fan 58 mounted on the outer shell 54. The outer shell encloses a further plenum having at its top an inlet to which the fan 58 is fitted for forcing air into the further plenum, and an outlet which is connected to the flue duct 52.

The top end of this further plenum is formed by a cover member 103 on which the fan 58 is mounted and to which the duct 52 is connected. The cover forms the top of the outer shell 54 and is of cast metal construction. The ceramic heat wheel 70 is received within the cover member and is mounted for rotation about a vertical axis by a shaft 82 which extends through the cover member and a drive motor 71 which is located above the cover member. Bearings (not shown) in the cover member journal the shaft for rotation. The cover member has a peripheral skirt 102 which surrounds the heat wheel, and makes a gas-tight connection with the top edge of the outer shell 54.

Supported within the further plenum below the heat wheel 70 is a static heat exchanger 65 through which water to be heated can be circulated via water pipes 67, 68. The heat exchanger is of conventional cast iron construction and formed with interior passages through which the heated gas can pass upwardly in cross-flow relation to water in the pipes, 67, 68. The heat exchanger is mounted at a spacing below the heat wheel 70, the gap between it and the heat wheel being spanned by a shaped hood 60 which is mounted on the heat exchanger and has its upper free edge 84 located closely adjacent the underside of the heat wheel as is later to be described.

Beneath the water pipes 67, 68 and forming a downward extension of its exterior surround, the heat exchanger has a depending skirt 120 which may be formed integrally with the heat exchanger and/or of fabricated construction. The skirt is downwardly open and within it is mounted a gas burner 64 for which gas may be supplied in conventional manner through induction pipe 121. If desired, a layer of heat resistant material 140 may be provided as an insulating lining for the skirt 120 above the burner.

The skirt 120, the exterior surround of the heat exchanger, the hood 60 and the cover 103 together subdivide the further plenum mentioned above into first and second juxtaposed plenums 61, 62 through which the gas passages of the ceramic heat wheel 70 may pass alternately as the heat wheel rotates. The burner 64 and the heat exchanger are associated with the second plenum 62. A further subdivision of the further plenum is provided by an inner shell 72 which with the outer shell 54 forms a generally double-skin housing for the boiler, the two shells together defining a passage 73 by which cool incoming air received from a narrow peripheral region of the heat wheel body is directed to pass downwardly over the inside surface of the outer shell 54 at the front of the boiler, across the inside surface of the outer shell bottom, and then upwardly over the inside surface of the outer shell at the rear of the boiler, eventually to pass once again through the peripheral region of the heat wheel body. The sides of the boiler housing are formed by the outer shell 54 alone, cooling in that region being effected by the incoming air flowing along the inflow plenum 55.

In the embodiment of FIG. 1 the cooling air and the heated combustion air are not segregated from one another at the bottom of the boiler, where the two plenums 8, 10 meet. However, by suitable design of the boiler the air flow in that region is made substantially laminar, and substantially no mixing of the cooling and combustion airs occurs. In this second embodiment, however, the cooling air passage 73 is segregated entirely from the air which is heated by the heat wheel 70 and later forms the combustion air for the burner 64.

The heat wheel 70 of the second embodiment is of the same construction and functions in essentially the same way as the heat wheel of the embodiment shown in FIG. 1. The hot gases having passed over the static heat exchanger 65 and having given up most of their heat to this heat exchanger are directed by the hood 60 to pass through a part-circular region of the heat wheel body to which they give up their residual heat, and this heat is transferred to the air stream flowing through the first plenum.

The free top edge 84 of the hood 60 is generally D-shaped in plan view, so as to define a correspondingly shaped part-circular region of the heat wheel through which the combustion gases pass. The arcuate part of the hood forms part of the inner periphery of the cooling air path 73. The ends of this arcuate part of the hood are joined by an inclined flat part 160, the upper edge of which, forming part of the free edge 84, extends generally diametrally of the heat wheel but is offset towards the back of the boiler beyond the drive shaft 82 and associated bearings of the heat wheel. The shaft and bearings of the heat wheel are therefore located in the flow of cold fresh air from the fan 58 as directed to the top of the heat wheel by the cover member 103; the cover member 103 also serves to direct the combustion gases from the heat wheel and into the flue duct 52.

When the boiler is operated the fan and heat wheel motors are energized and then the boiler is ignited. The gas flow through the boiler is indicated by the arrows in the drawing. The fan creates a slight suction in the inflow plenum 55, causing ambient air to be drawn in through the air intake duct 51 and to flow down through rear compartment 55A and then up through front compartment 55B, the cold air flow cooling the outer casing 53 and shell 54. The reduced pressure in plenum prevents any possibility of leakage of the combustion gases into the interior of the building.

The fan 58 forces the air down through that part of the heat wheel body received in the first plenum 61. The main air stream is fed to the lower end of the second plenum 62 in which hot air and combustion gases from the gas burner 64 rise over the static heat exchanger 65 giving up most of their heat to the water circulating through the heat exchanger. As the gases pass up through the heat wheel in the second plenum their temperature is substantially reduced, the heat extracted by the heat wheel serving to preheat the incoming air flowing through the first plenum 61 as described above. Further recuperative heat transfer will occur between the flue duct 52 and the air intake duct 51, by virtue of the coaxial arrangement of those ducts.

It will be noted that the fresh air flow through the inflow plenum 55 passes over the surfaces of the outer casing 53 and the exterior of the boiler housing (provided by the shell 54) to cool them; in addition, the secondary air stream in the passage 73 (which by-passes the burner) serves to cool not only the shell 54 but also the interior housing 72. These cooling air flows therefore ensure that the walls of the boiler remain relatively cool without any thermal insulation, and minimize the loss of heat to the inside of the building.

In the boilers as described above with reference to FIGS. 1 and 2 the first and second plenums are arranged in a series flow path through the boiler so that, with suitable allowance made for the effect of the gas burner, the gas flows through the two plenums are the same. With such an arrangement condensation will not occur, except possibly under certain relatively infrequent conditions of operation. The boiler will therefore operate in a largely noncondensing mode, but with an improved thermal efficiency by virtue of the recuperative effect of the heat wheel. Any condensation which does occur does so exclusively on surfaces provided by the heat wheel 12 or 70, no condensation occurring on the static heat exchanger (22, 65) which accordingly may be of the relatively cheap construction and materials conventionally used for the heat exchangers of noncondensing boilers. A substantial and further increase of the thermal efficiency of each of the boilers shown in FIGS. 1 and 2 may be achieved by increasing the flow of fresh air through the first plenum in relation to that passing through the second plenum via the burner. In FIG. 1 this is achieved by a conduit 90 which is connected to the air guide 28 at the base of the boiler and through which heated air may be bled from the boiler as and when desired. Air flow through the conduit may be controlled by a butterfly valve 91; in addition, the speed of the fan 6 may be suitably controlled, by means not shown, so as to increase from a lower to a higher value with opening of the valve. In this way the burner 25 may be operated continuously at substantially optimum efficiency whilst a controllable flow of heated fresh air is available from the connection 90 for space heating purposes if desired. For some conditions of operation, in particular in hot weather, it may be preferred to vent the heated air rather than use it for space heating (or close the valve 91); suitable provision may be made to connect the conduit alternatively to the exterior of the building for this eventuality.

FIG. 3 shows how the boiler of FIG. 2 may be provided with a fresh air bleed. A conduit 90' is connected to the interior housing 72 at the bottom of the boiler, and arranged to duct heated fresh air to the front of the boiler. A manually operable flap 92 enables the bleed air flow to be controlled as desired. The flap 92 serves the same function as the butterfly valve 91 of FIG. 1, and is likewise associated with a controller by which the motor for the fan 58 is controlled between lower and higher speeds to maintain optimum burner efficiency.

By increasing the fresh air passing through the heat wheel in relation to the combustion gases, the extraction of heated air from the boiler via the conduits 90, 90' enables the boilers of FIGS. 1 and 3 to operate in essentially a condensing mode. The condensation is again restricted to the heat wheel, forming tiny water droplets in the passages of the heat wheel which are expelled invisibly with the flue gases. Substantially all the sensible and latent heat of the combustion gases is thereby transferred to either the fresh air bleed from the conduit 90, 90' or the heated water from the static heat exchanger 22, 65; accordingly the temperature of the flue gases leaving the boiler is very substantially the same as that of the fresh air environment of the boiler, and little or no "pluming" of the flue gases will occur, even in very cold weather.

It will thus be understood from the foregoing that, in comparison with conventional condensing boilers, those described with reference to FIGS. 1 and 3 will have the advantages of non-pluming flue discharge, little or no requirement for cleaning, and few (if any) corrosion problems due to deposition of water either on the static heat exchanger or in the outlet flue. The boilers are also compact, relatively light in weight, of simple construction and cheap to produce; moreover, the housings can readily be provided with removable or separable panels allowing access to the boiler interior for maintenance purposes.

Whilst the embodiments of the invention described above employ a rotary heat exchanger of which the thermal transfer body is formed of an extruded matrix of cordierite material, other thermal transfer materials are possible, of ceramic material or otherwise. The material should be of hygroscopic nature if condensation is to occur; moreover, it should combine resistance to high temperatures and thermal shock with corrosion resistance.

Where provision is made for heated fresh air to be bled away and used for space heating purposes it is more important that flue gases should not leak over into the fresh air at the heat wheel. In the case of the boiler of FIGS. 2 and 3, as in the boiler in FIG. 1, it can be arranged, by means of additional partition walling if necessary, that the fresh air not heated by the burner flows through the heat wheel over an annular area surrounding the area confined by the upper edge 84 of the hood 160, to ensure that the combustion gases are purged from the passages of the heat wheel before they cross over to the fresh air side. As already mentioned above, the fan in both embodiments ensures a higher pressure on the fresh air side which deters leakage of flue gases into the fresh air flow. As an additional measure the heat wheel can be disposed with a close fit within a circular housing member of cast construction, this member being machined to provide a circumferential groove on its inner surface whereby the member forms a labyrinth seal at the heat wheel periphery to deter leakage axially past the wheel, and the groove allows the higher pressure fresh air to pass around the heat wheel towards the flue gas side and oppose flow of gases in the reverse direction. For further details of the sealing housing member reference should be made to our copending application filed on the same day and claiming priority from the United Kingdom Applications 8812252.8 and 8812253.6.

I claim:

1. A boiler, having a housing providing a gas flow path including a first gas plenum and a second gas plenum connected in series relation between an air intake and an air outlet flue for the boiler, the first and second plenums having portions in juxtaposition, the boiler having, within the housing, a rotary heat exchanger, a burner and a static heat exchanger, the rotary heat exchanger having a multiplicity of gas passages and being disposed and rotatable so that parts thereof may be moved alternately through the first and second plenums to transfer heat therebetween, whereby at least part of the gas in said flow path is constrained to pass in each of the first and second plenums in opposite directions through said gas passages of the rotary heat exchanger, the burner being disposed in the gas flow path between the said parts of the rotary heat exchanger, and the static heat exchanger being disposed in the gas flow path between the burner and the part of the rotary heat exchanger received in the second plenum and adapted for circulation therethrough of a fluid to be heated.

2. A boiler according to claim 1, wherein means are provided for dividing the gas passing in the gas flow path between the said parts of the rotary heat exchanger into a combustion air stream and a cooling air stream, the rotary heat exchanger being arranged for substantially heating only the combustion air stream, and the cooling air stream being directed to pass along walls of the housing for cooling the same.

3. A boiler according to claim 2, which includes a combustion housing for the burner, disposed within the said boiler housing and forming a gap with the same, the combustion air stream passing at least substantially through the combustion housing and the cooling air stream passing at least substantially through the said gap.

4. A boiler according to claim 3, wherein the combustion housing is positioned for a portion of said cooling air stream to flow over the inner surface of the combustion housing for cooling the same.

5. A boiler according to claim 3, wherein the gas flows passing through the combustion housing and through the gap are directed to pass through respective areas of the rotary heat exchanger in the second plenum.

6. A boiler according to claim 5, wherein the gas flow passing through the combustion housing is directed to a medial band region of the rotary heat exchanger, and the gas flow passing through the gap is directed to central and peripheral band regions of the rotary heat exchanger.

7. A boiler according to claim 2, wherein the means for dividing the gas flow comprises a guide arranged for collecting heated air from the rotary heat exchanger in the first plenum and for delivering it towards the burner surrounded by the cooling air stream.

8. A boiler according to claim 1, including a fan for creating gas flow through said flow path.

9. A boiler according to claim 8, wherein the fan is located downstream of the second plenum.

10. A boiler according to claim 8, wherein the driving means comprises a motor arranged to drive both the rotary heat exchanger and the fan.

11. A boiler according to claim 8, wherein an inflow plenum is located between the air intake and the first plenum and generally surrounds the first and second plenums in heat conductive relation therewith, and the fan is located upstream of the first plenum but downstream of the inflow plenum.

12. A boiler according to [any preceding] claim 1, which has conduit means connected to the gas flow path between the burner and the part of the rotary heat exchanger received in the first plenum, whereby to remove from the gas flow path some of the air heated by the rotary heat exchanger.

13. A boiler according to claim 1, wherein the rotary heat exchanger has heat exchange material formed of a ceramic material having a multiplicity of pores.

14. A boiler according to claim 13, wherein the ceramic material is cordierite.

15. A boiler according to claim 13, wherein the ceramic material is formed as a disc rotatable about its centre, the ceramic material having a matrix of straight pores extending axially of the disc.

16. A boiler according to claim 15, wherein the pores have a density (transversely of the disc) of at least 60 pores per sq. cm.

17. A boiler according to claim 13, wherein the ceramic material is formed as a disc rotatable about its center, the ceramic material having a sponge-like nature, said pores of the ceramic material being tortuous and providing said gas passages which extend generally axially of the disc between the opposed faces thereof.

18. A condensing boiler, having a housing providing a gas flow path including a first gas plenum and a second gas plenum connected in series relation between an air intake and an outlet flue for the boiler, the first and second plenums having portions in juxtaposition, the boiler having, within the housing, a rotary heat exchanger, a burner and a static heat exchanger, the rotary heat exchanger having a multiplicity of gas passages and being disposed and rotatable so that parts thereof may be moved alternately through the first and second plenums to transfer heat therebetween, whereby at least part of the gas in said flow is constrained to pass in each of the first and second plenums in opposite directions through said gas passages of the rotary heat exchanger, the burner being disposed in the gas flow path between the said parts of the rotary heat exchanger, and the static heat exchanger being disposed in the gas flow path between the burner and the part of the rotary heat exchanger received in the second plenum and adapted for circulation therethrough of a fluid to be heated, the boiler including conduit means connected to the gas flow path between the burner and the part of the rotary heat exchanger received in the first plenum, for removing from the gas flow path some of the air heated by the rotary heat exchanger, in operation of the boiler water vapour condensing in the gas passages of the rotary heat exchanger, the second plenum but the static heat exchanger being non-condensing.

19. A boiler according to claim 18, wherein the rotary heat exchanger has heat exchange material formed of a ceramic material having a multiplicity of pores.

20. A boiler according to claim 19, wherein the ceramic material is cordierite.

21. A boiler according to claim 19, wherein the ceramic material is formed as a disc rotatable about its center, the ceramic material having a matrix of straight pores extending axially of the disc.

22. A boiler according to claim 21, wherein the pores have a density (transversely of the disc) of at least 60 pores per sq. cm.

23. A boiler according to claim 19, wherein the ceramic material is formed as a disc rotatable about its center, the ceramic material having a sponge-like nature, said pores of the ceramic material being tortuous and providing said gas passages which extend generally axially of the disc between the opposed faces thereof.

24. A boiler according to claim 18, which further includes a valve for said conduit means, and means to control the gas flow through the first plenum in dependance upon the position of the valve, the gas flow through the first plenum increasing from a lower value to a higher value with opening of the valve.

25. A boiler according to claim 18 wherein the conduit means is arranged to direct, or capable of directing, the removed heated air for space heating purposes.

* * * * *